US009406053B2

(12) United States Patent  (10) Patent No.: US 9,406,053 B2
Vigue et al.  (45) Date of Patent: Aug. 2, 2016

(54) MOBILE CHECK ISSUE CAPTURE SYSTEM AND METHOD

(71) Applicant: Bottomline Technologies (DE) Inc., Portsmouth, NH (US)

(72) Inventors: Michael Vigue, Portsmouth, NH (US); Sean Mallean, Alpharetta, GA (US); Jessica Cheney, Portsmouth, NH (US)

(73) Assignee: Bottomline Technologies (DE) Inc., Portsmouth, NH (US)

( * ) Notice: Subject to any disclaimer, the term of this patent is extended or adjusted under 35 U.S.C. 154(b) by 165 days.

(21) Appl. No.: 13/778,712

(22) Filed: Feb. 27, 2013

(65) Prior Publication Data

US 2014/0241609 A1  Aug. 28, 2014

(51) Int. Cl.
*G06Q 20/42* (2012.01)
*G06Q 20/04* (2012.01)

(52) U.S. Cl.
CPC .................... *G06Q 20/042* (2013.01)

(58) Field of Classification Search
CPC . G06Q 20/042; G06Q 30/0185; G06Q 40/02; G06Q 20/382
See application file for complete search history.

(56) References Cited

U.S. PATENT DOCUMENTS

| | | | | |
|---|---|---|---|---|
| 5,757,958 A * | 5/1998 | Shimizu et al. | ................ | 382/181 |
| 5,905,976 A * | 5/1999 | Mjolsnes et al. | ................ | 705/39 |
| 6,021,202 A * | 2/2000 | Anderson | ................ | G06F 17/24 |
| | | | | 705/18 |
| 6,464,134 B1 * | 10/2002 | Page | ................ | G06Q 20/04 |
| | | | | 235/375 |
| 7,584,128 B2 * | 9/2009 | Mason et al. | ................ | 705/35 |
| 7,885,451 B1 * | 2/2011 | Walls et al. | ................ | 382/137 |
| 2002/0099652 A1 * | 7/2002 | Herzen | ................ | G06Q 20/02 |
| | | | | 705/39 |
| 2005/0071283 A1 * | 3/2005 | Randle et al. | ................ | 705/75 |
| 2005/0109833 A1 * | 5/2005 | Page | ................ | G06Q 20/04 |
| | | | | 235/379 |
| 2007/0112674 A1 * | 5/2007 | Jones | ................ | 705/45 |
| 2008/0247629 A1 * | 10/2008 | Gilder | ................ | G06Q 20/04 |
| | | | | 382/137 |
| 2010/0027896 A1 * | 2/2010 | Geva et al. | ................ | 382/229 |
| 2010/0198733 A1 * | 8/2010 | Gantman et al. | ................ | 705/75 |
| 2011/0320357 A1 * | 12/2011 | Gilson | ................ | G06Q 40/00 |
| | | | | 705/45 |
| 2012/0177281 A1 * | 7/2012 | Frew | ................ | G06Q 30/0609 |
| | | | | 382/137 |
| 2015/0120563 A1 * | 4/2015 | Smith | ................ | G06Q 20/042 |
| | | | | 705/45 |

* cited by examiner

*Primary Examiner* — Siamak Harandi
*Assistant Examiner* — Pinalben Patel
(74) *Attorney, Agent, or Firm* — Renner, Otto, Boisselle & Sklar, LLP (57) ABSTRACT

A system and method is presented for assembling information contained within a financial instrument for subsequent verification of the financial instrument, wherein the financial instrument includes an identifier corresponding to a payee of the financial instrument. An imaging device, such as, for example, a mobile phone or the like, is used to obtain an image of the financial instrument prior to the financial instrument being transferred to the payee. Information is extracted from the image of the financial instrument, and the information is transferred to a storage area that is separate and remote from the imaging device.

10 Claims, 5 Drawing Sheets

MOBILE CHECK ISSUE CAPTURE SYSTEM AND METHOD

TECHNICAL FIELD

The present invention relates to electronic verification of financial information and, more particularly, to a system and method for creating check issuance information for verifying a check.

BACKGROUND OF THE INVENTION

Payment for goods and services can take various forms, such as cash payments, drafts (e.g., checks), etc. As is known, a check is a document that orders payment of money from an account, e.g., a bank account. The person writing a check, the drawer, has an account having money available for withdrawal. The drawer writes the various details including the monetary amount, date, and a payee on the check, and signs it, thereby ordering the drawee (e.g., the bank at which the account is held), to pay the payee the amount of money stated. The payee then can submit the check for deposit into an account or immediate payment to the payee.

SUMMARY OF THE INVENTION

A problem when using certain financial instruments, such as checks, as a form of payment is the potential for error, fraud, etc. This can result in incorrect and/or unauthorized payments from the drawer's account. A system and method in accordance with the present invention enables the occurrence of fraud and error to be minimized.

In accordance with one aspect of the invention, prior to transferring a check to a payee, an image of the check is obtained, e.g., via a mobile device or other image capture device. Information then is extracted from the image of the check (e.g., the image of the check is converted into digital information, and financial information is extracted therefrom). The extracted information is uploaded to a financial institution, e.g., the drawer's bank, where it is stored for use during a subsequent verification process. Upon the check being subsequently presented for payment, the information on the check as presented for payment can be compared to the previously uploaded information, i.e., the information extracted prior to transfer of the check to the payee. If the information on the check as presented for payment and the stored information match, then payment can proceed. However, if there is a discrepancy between the check and the stored information, then the drawer can be contacted to confirm whether or not payment should proceed.

According to one aspect of the invention, a system for assembling information contained within a financial instrument for subsequent verification of the financial instrument, the financial instrument including an identifier corresponding to a payee of the financial instrument, includes: an information generation device, comprising an image capture device configured to capture an image of an object, and a first communication circuit configured to communicate the extracted information over a network; and a verification device remote from the information generation device, the verification device comprising a second communication circuit configured to communicate with the first communication circuit over a network, and a database for storing information corresponding to financial instruments, said information for use during a subsequent verification process, wherein the verification device is configured to at least one of i) receive from the information generation device information extracted from an image of the financial instrument and store the extracted information in the database, said image captured prior to transfer of the financial instrument to the payee, or ii) receive an image of the financial instrument captured from the information generation device, extract information from the image, and store the extracted information in the database, said image captured prior to transfer of the financial instrument to the payee.

According to one aspect of the invention, the verification device is configured to perform a verification process upon the financial instrument being presented for payment, said verification process comprising comparing information on the financial instrument as presented for payment with corresponding information stored in the database and obtained prior to transfer of the financial instrument to the payee.

According to one aspect of the invention, the verification device comprises a verification device of a financial institution.

According to one aspect of the invention, the verification device comprises an intermediate storage area independent from a payer of the financial instrument and a financial institution in which the payer has an account.

According to one aspect of the invention, the information capture device comprises a mobile phone.

According to one aspect of the invention, the information generation device or the verification device comprises a data extraction circuit configured to extract information from an image of a financial instrument captured.

According to one aspect of the invention, the data extraction circuit is configured to extract at least one of a payment amount, a payment date, a payee name, an account number, a routing number or a check number.

According to one aspect of the invention, the information generation device is configured to assemble extracted information into a container.

According to one aspect of the invention, the information generation device is configured to assemble the extracted information into a container having the form of a file.

According to one aspect of the invention, a method is provided for assembling information contained within a financial instrument for subsequent verification of the financial instrument, the financial instrument including an identifier corresponding to a payee of the financial instrument. The method includes: using an imaging device to obtain an image of the financial instrument, said image obtained prior to transferring the financial instrument to the payee; extracting information from the image of the financial instrument; and transferring the extracted information to a storage area, wherein the storage area is separate and remote from the imaging device.

According to one aspect of the invention, transferring the extracted information to the storage area comprises transferring the information to a financial institution in which a payer of the financial instrument has an account.

According to one aspect of the invention, transferring the extracted information to the storage area comprises transferring the information to an intermediate storage area independent from a payer of the financial instrument and a financial institution in which the payer has an account.

According to one aspect of the invention, using an imaging device comprises using a hand-held mobile device to obtain the image of the financial instrument.

According to one aspect of the invention, obtaining the optical image of the financial instrument comprises obtaining a photographic image of the financial instrument.

According to one aspect of the invention, extracting the information comprises extracting at least one of a payment amount, a payment date, a payee name, an account number, a routing number or a check number.

According to one aspect of the invention, extracting the information comprises assembling the information into a container.

According to one aspect of the invention, assembling the information into a container comprises storing the extracted information in a file.

According to one aspect of the invention, transferring the extracted information to the financial institution comprises transferring the information to the financial institution via an internet connection.

According to one aspect of the invention, the method further includes storing the extracted financial information in a database.

According to one aspect of the invention, the method includes: upon the financial instrument being tendered, retrieving from the database information corresponding to the tendered financial instrument; comparing the retrieved information to information on the tendered financial instrument; and making payment or denying payment based on the comparison.

A number of features are described herein with respect to embodiments of the invention; it will be appreciated that features described with respect to a given embodiment also may be employed in connection with other embodiments.

For a better understanding of the present invention, together with other and further aspects thereof, reference is made to the following description, taken in conjunction with the accompanying drawings. The scope of the invention is set forth in the appended claims, which set forth in detail certain illustrative embodiments. These embodiments are indicative, however, of but a few of the various ways in which the principles of the invention may be employed.

DETAILED DESCRIPTION OF THE INVENTION

The present invention is now described in detail with reference to the drawings. In the drawings, each element with a reference number is similar to other elements with the same reference number independent of any letter designation following the reference number.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, function, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The system and method in accordance with the present invention enables information contained within a financial instrument to be readily assembled for subsequent verification of the financial instrument. As used herein, a financial instrument refers to a check, draft, bond, share, bill of exchange, futures or options contract that has a monetary value or other type instrument that represents a legally enforceable agreement between two or more parties regarding a right to payment of money.

Figure 1:
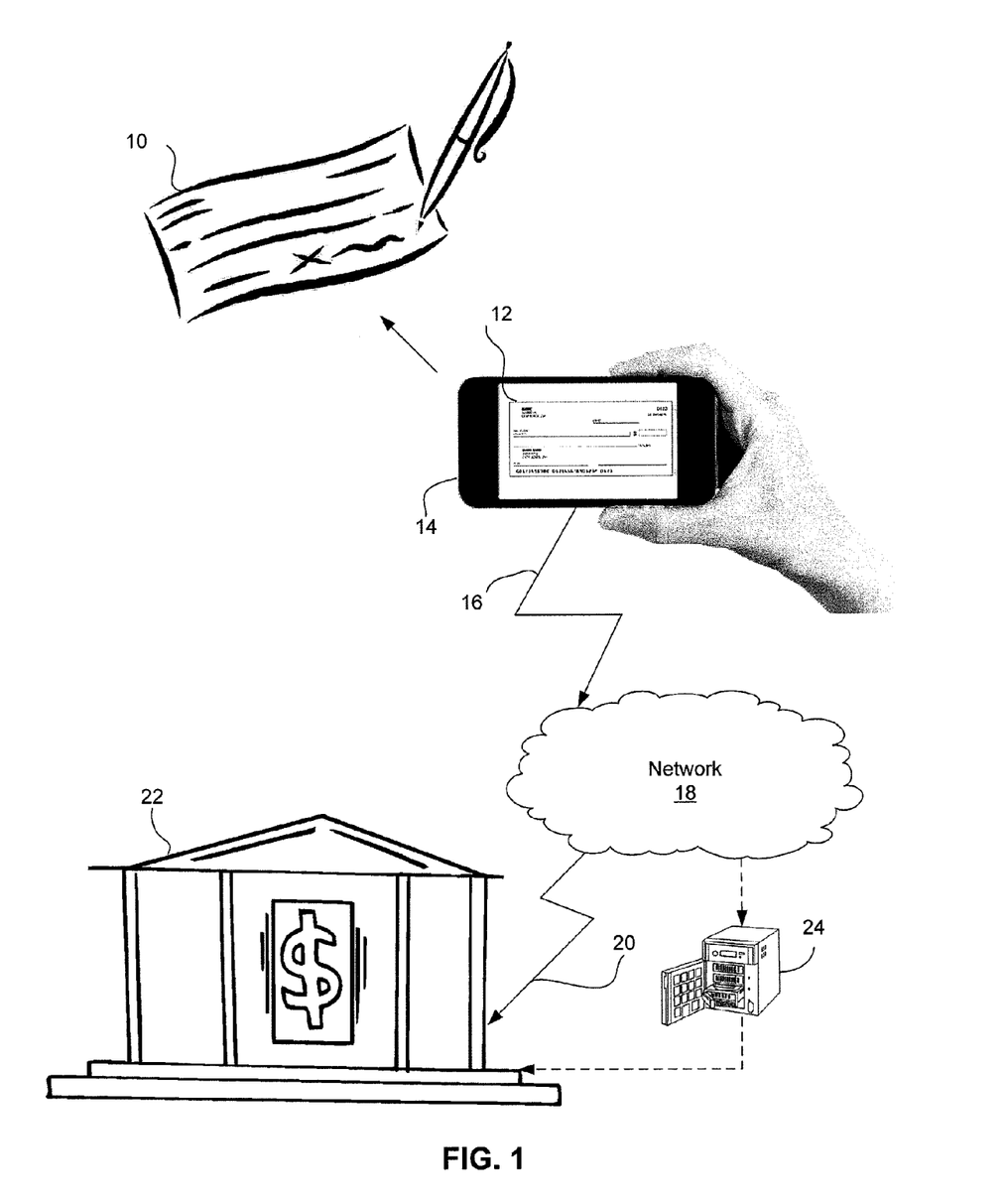
FIG. 1 is a schematic diagram illustrating use of an exemplary system and method in accordance with the present invention.

With reference to FIG. 1, a conceptual view of a system and method in accordance with the present invention is illustrated. More particularly, a financial instrument 10, such as a check, is initially blank. A payer (also referred to a drawee) fills out the check, which requests payment from the payer's account to a payee in a specified amount. Upon the payer completing the check, and prior to the check being transferred to the payee, the payer obtains an image 12 of the check. As used herein, the term "prior to transfer to the payee" is defined as a period of time in which the financial instrument is under the control of the payer or the payer's agent(s).

Preferably, the image is obtained using a portable (e.g., hand-held) information generation device 14, such as a mobile phone, smart phone, personal digital assistant (PDA), or the like, that has a built-in camera function for obtaining photographic-quality images. Alternatively, other devices may be used to obtain an image of the completed check. For example, a stand-alone photographic camera or scanner also can be used to obtain an image of the check. The obtained images then could be transferred to the information generation device 14 for further processing.

Upon the information generation device 14 obtaining an image of the check 10, the information is converted to digital form and an extraction operation is performed on the image data so as to extract the relevant financial information therefrom. For example, and as discussed in more detail below, account information, payment amount, payee name, etc. can be extracted from the check 10. The extracted information can be placed in a container, such as a file, for transfer to a storage area. Such transfer can occur, for example, via a connection 16 to a network 18, which may be an open network, such as the internet, a private network, such as a virtual private network, intranet, or any other suitable network.

In accordance with one embodiment, the information is transferred to the financial institution 22 at which the payer has a checking account corresponding to the issued check. In this regard, the information may be placed in a container, such as a file or the like, to enable easy transfer of the information. The container then can be transmitted to the financial institution 22, which also has a connection 20 to the network 18. The information then can be extracted from the container and placed in a database. For example, the financial institution may have an on-premises server or the like that includes or has access to an on-premises database. Alternatively, at least one of the server or the database may be remote from the financial institution (e.g., a local or remove server may access a local or remote database).

In another embodiment in accordance with the present invention, instead of the container of information being provided directly to the financial institution 22, the container is provided to an intermediate storage area managed, for example, by a third-party 24. The third party 24, which can be independent from one or both of the payer and the financial institution in which the payer has an account, may store the information in a database accessible by the financial institution 22. In accordance with a service agreement, the third party 24 provide the information to the financial institution 22. In this manner, the financial institution 22 need not be concerned with the collection, storage and maintenance of the information.

Figure 2:
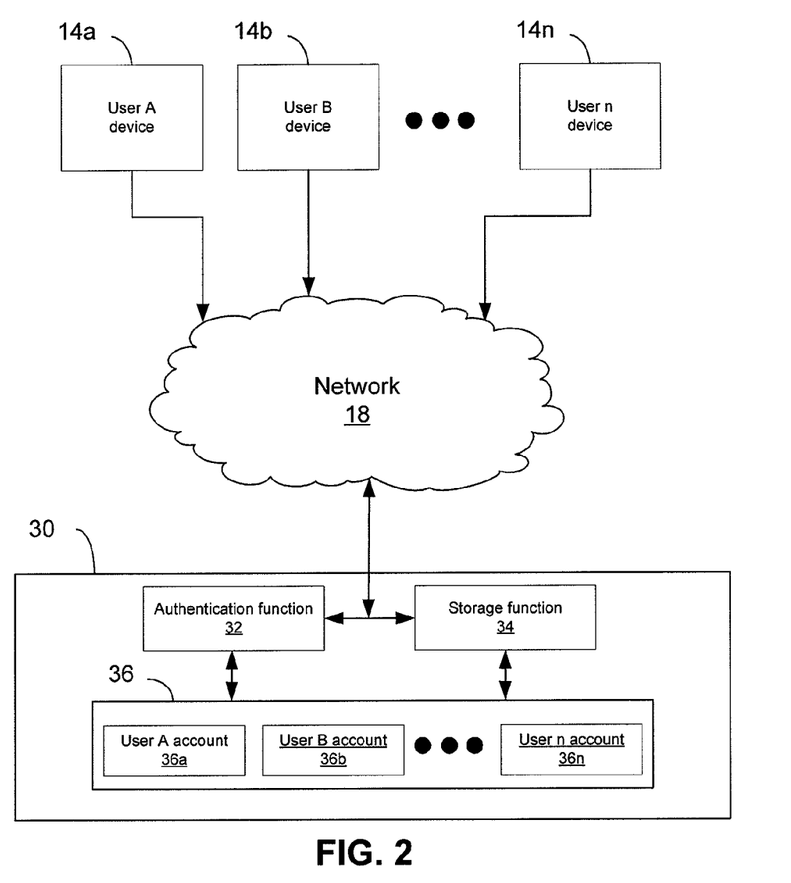
FIG. 2 is a block diagram illustrating an exemplary system in accordance with the present invention, where multiple users collect and store information prior to disbursement of a financial instrument.

With further reference to FIG. 2, a general architecture of the system in accordance with the present invention is shown for multiple users. More specifically, multiple users each may have an information generation device. For example, a first user (user A) has a first information generation device 14a, a second user (user B) has a second information generation device 14b, and an $n^{th}$ user (user n) as an $n^{th}$ information generation device 14n. Each of the respective information generation devices 14a-14n may be communicatively coupled to a verification device 30 via a network connection 18, such as an internet connection, for example, and may include a wired connection, a wireless connection, or combination of a wired connection and a wireless connection.

The authentication device 30, which preferably includes a computer server or the like, includes an authentication circuit 32 and a storage circuit 34, each of which will be described in more detail below. Briefly, the storage circuit 34 receives containers of information from the respective information generation devices 14a-14n via the network 18, and stores the information in a database 36 for use during a verification step. During a subsequent verification process, the authentication circuit 32 compares information provided on the check at the time payment is requested by the payee with information stored in the database 36 (which is based on data obtained prior to the check being transferred to the payee). Based on the comparison, the authentication circuit 32 can determine whether or not payment should be made to the payee.

It is noted that while the authentication circuit 32 and the storage circuit 34 are illustrated as being part of the same device, the respective circuits could be parts of separate devices. For example, a first server could have the storage circuit 34, while a second server could have the authentication circuit 32. This scenario may occur, for example, when the third party 24 is involved with the process. More specifically, the third party 24 may collect, organize and store the data in the database 36, while the financial institution 24 may retrieve the data from the database and verify that check presented for payment matches the data stored in the database.

The database 36 includes for multiple tables for each user account. More specifically, the database 36 stores data corresponding to user A's account in a first table 36a, data corresponding to user B's account in a second table 36b, data corresponding to user n's account in an $n^{th}$ table 36n, etc. Each table 36a-36n includes, for example, one or more of information regarding the financial institution's routing number, the user's account number, the user's check number, the payment amount, date and payee name. As will be discussed in more detail below, the respective tables are populated based on information extracted from a check prior to the check being transferred to a payee.

Figure 3A:
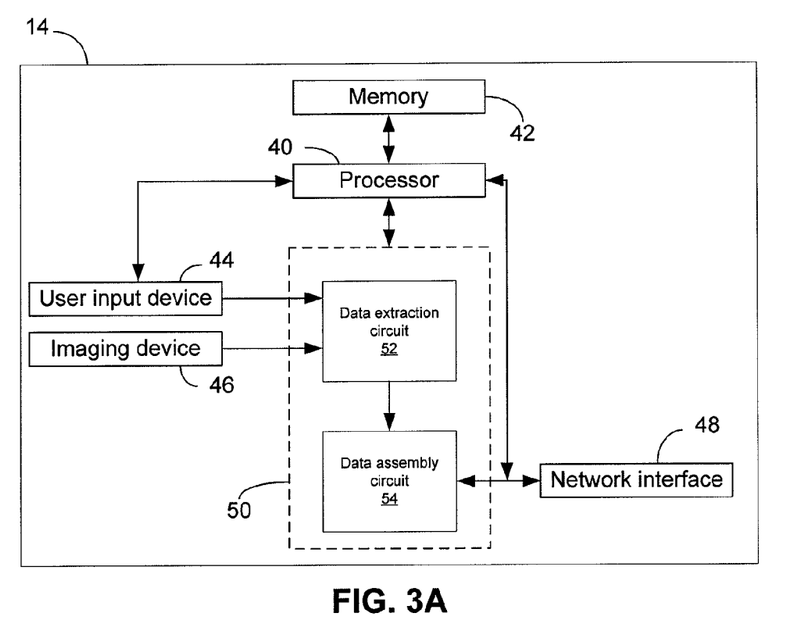
FIG. 3A is a block diagram illustrating an exemplary data generation device that can be used in the system and method in accordance with the invention.

Moving now to FIG. 3A, shown in more detail is an exemplary information collection device 14. The information collection device 14, which may be a portable hand-held device such as a mobile phone, smart phone, PDA, or the like, includes a processor 40 and memory 42 for executing instructions as is conventional. Although not shown, the memory 42 may include volatile memory (RAM) which is used by the processor 40 in performing computations, and nonvolatile memory (NVRAM) for storing computer executable instructions to be executed by the processor 40 and/or long term data storage.

Operatively coupled to the processor is a user input device 44, such as a key pad, pointer, touch screen, or the like. The user input device 44 enables a user to input data into the information generation device 14, e.g., to correct and/or enter data as found on the check 10, as will be described in more detail below. In addition, an imaging device 46, such as a photographic camera or the like, is also operatively coupled to the processor 40. Preferably, the imaging device 46 is operable to obtain photographic quality images of an object, such as the check 10.

To communicate information to/from the information generation device, a first communication circuit 48, such as a network interface, is provided in the information generation device 14. The network interface may include a local wireless interface, such as an infrared transceiver and/or an RF adaptor (e.g., a Bluetooth adapter), for establishing a communication link between the information generation device and another device.

The information generation device 14 further includes circuitry 50 for extracting information from an image and assembling the information into a container. As noted above, the circuitry 50 can be implemented via hardware, software executed by the processor 40, or a combination of hardware and software. The circuitry 50 includes a data extraction circuit 52, and a data assembly circuit 54.

Addressing first the data extraction circuit 52, image data, e.g., a digital image of the check as captured by the imaging device 46, is provided to the data extraction circuit 52. The data extraction circuit 52 analyzes the received data, and converts the image data into meaningful information. For example, the data extraction circuit 52 can apply an optical character recognition (OCR) method on the image data received from the imaging device 46. OCR is well known in the art and thus will not be discussed herein. Briefly, OCR is an electronic conversion of scanned images of handwritten, typewritten or printed text into machine-encoded text. Using OCR methods in combination with the known format of checks or other financial instruments, the information contained therein can be readily extracted.

Figure 4:
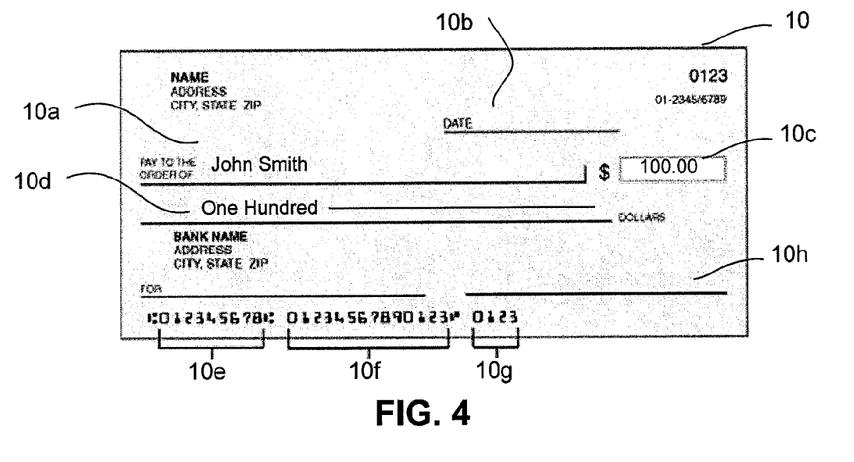
FIG. 4 illustrates a conventional financial instrument in the form of a check.

Briefly referring to FIG. 4, an exemplary financial instrument in the form of a check 10 is shown. As is conventional, the check 10 has a number of entries for specifying to whom payment is to be made, the amount of the payment, and the account number from which the funds are to be used for making the payment. More specifically, the check 10 includes a payee entry 10a for entering the name of the payee, i.e., the person or entity that is to receive payment, a date entry 10b for specifying the date the check was issued, a numerical payment entry 10c for numerically specifying the amount to be paid to the payee, a text payment entry 10d for specifying textually specifying the amount to be paid to the payee. In addition, the check includes a routing number 10e that specifies the financial institution in which the payee has an account, an account number 10f that specifies the payee's account number, and a check number 10g that numerically identifies the check 10. Finally, the check 10 includes a signature entry 10h in which the payee signs his or her name, thereby authorizing the payment.

Referring back to FIG. 3A, the data extraction circuit 52 can extract from an image of the check 10 one or more of the above referenced entries 10a-10h. Based on the known format of the check 10 as well as the extracted entries 10a-10c, the specifics of the check can be determined. It is noted that while reference is made to OCR, other methods of extracting information from an image may also be utilized without departing from the scope of the present invention.

The extracted information may be presented on a display of the information generation device 14 for review. If any errors are detected in the extracted information, a user, via the user input device 44, can alter the information to ensure it accurately reflects the information on the check 10. The extracted (and if necessary—corrected) information then is provided to the data assembly circuit 54, e.g., via a bus, software, etc.

The data assembly circuit 54 organizes the data into a predetermined format, and stores the information in a container, such as a metafile or the like. Alternatively, the data assembly circuit 54 may store the extracted information in a text file using comma-separated values (CSV). Creating containers such as metafiles, text files, etc. is well known and thus will not be discussed herein. Upon creating the container with the extracted information, the container is transferred via the network interface 48 to the verification device 30 for storage in the database 34.

Figure 3B:
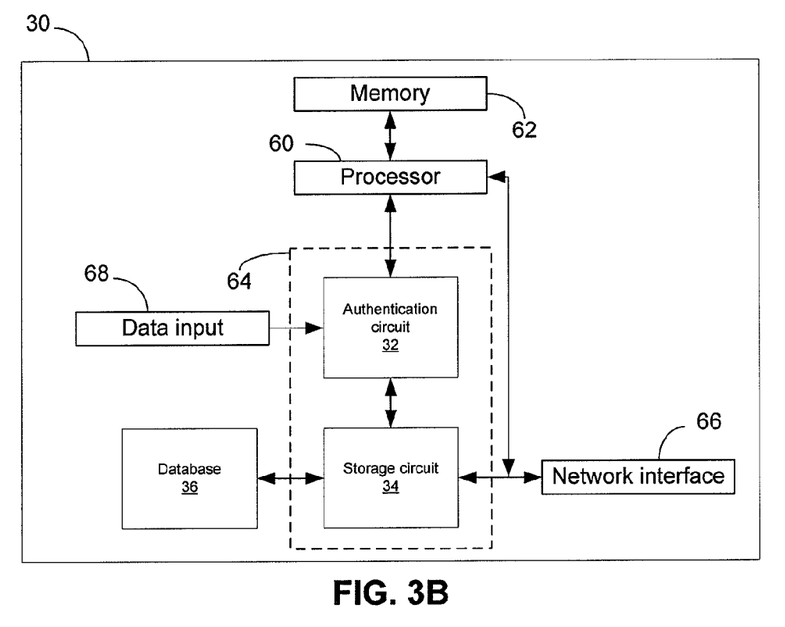
FIG. 3B is a block diagram illustrating an exemplary verification device that can be used in the system and method in accordance with the invention.

Referring now to FIG. 3B, the exemplary verification device 30, which preferably is a computer server or the like located remote from the information generation device 14, also includes a processor 60 and memory 62 for carrying out instructions as is conventional. Although not shown, the memory 62 may include volatile memory (RAM) which is used by the processor 60 in performing computations, and nonvolatile memory (NVRAM) for storing computer executable instructions to be executed by the processor 60, as well as long term storage of information. Coupled to the processor 60 is circuitry 64 for verifying the authenticity of a financial instrument, such as a check. The circuitry 64 includes the authentication circuit 32 and the storage/retrieval circuit 34. The database 36, which may be stored in memory of the authentication device 30, e.g., within NVRAM of the memory 62, or remote from the authentication device (e.g., under the control of a third party), is accessible by the storage and retrieval circuit 34. A second communication circuit 66, e.g., a network interface, enables a communication link to be established with the information generation device 14.

Operatively coupled to the processor 60 and authentication circuit 32 is an input device 68 for inputting information found on the check as presented for payment. Such input device 68 may be a key pad, touch screen, or the like, wherein information on the check may be manually entered into the authentication system 32 via the key pad, touch screen, etc. Alternatively, the input device 66 may be a scanning device that obtains an image of the check and extracts the relevant information thereon.

The information obtained from the check 10 as presented for payment then is provided to the authentication circuit 32, which searches the database 36 based on one or more of the account number 10f, check number 10g, routing number 10e or payer name 10h. If a match for the specific check is found in the database 36, the corresponding information, which was collected prior to the check being transferred to the payee, is retrieved and compared with the information as determined at the time the check is presented for payment. Based on the comparison, it can be determined if payment should be made or denied.

It is noted that while the data extraction circuit 52 is shown implemented in the information generation device 14, in another embodiment the functions of the data extraction circuit 52 could be implemented elsewhere, e.g., within the verification device 30. For example, the information generation device 14 could transmit the image of the check to the verification device 30, and the verification device 30 then could extract the information from the image. In this regard, the information generation device could attach an identifier (e.g., account number, name, etc.) to the image that enables the verification device 30 to confirm the data extracted from the image is linked to the correct account.

Figure 5:
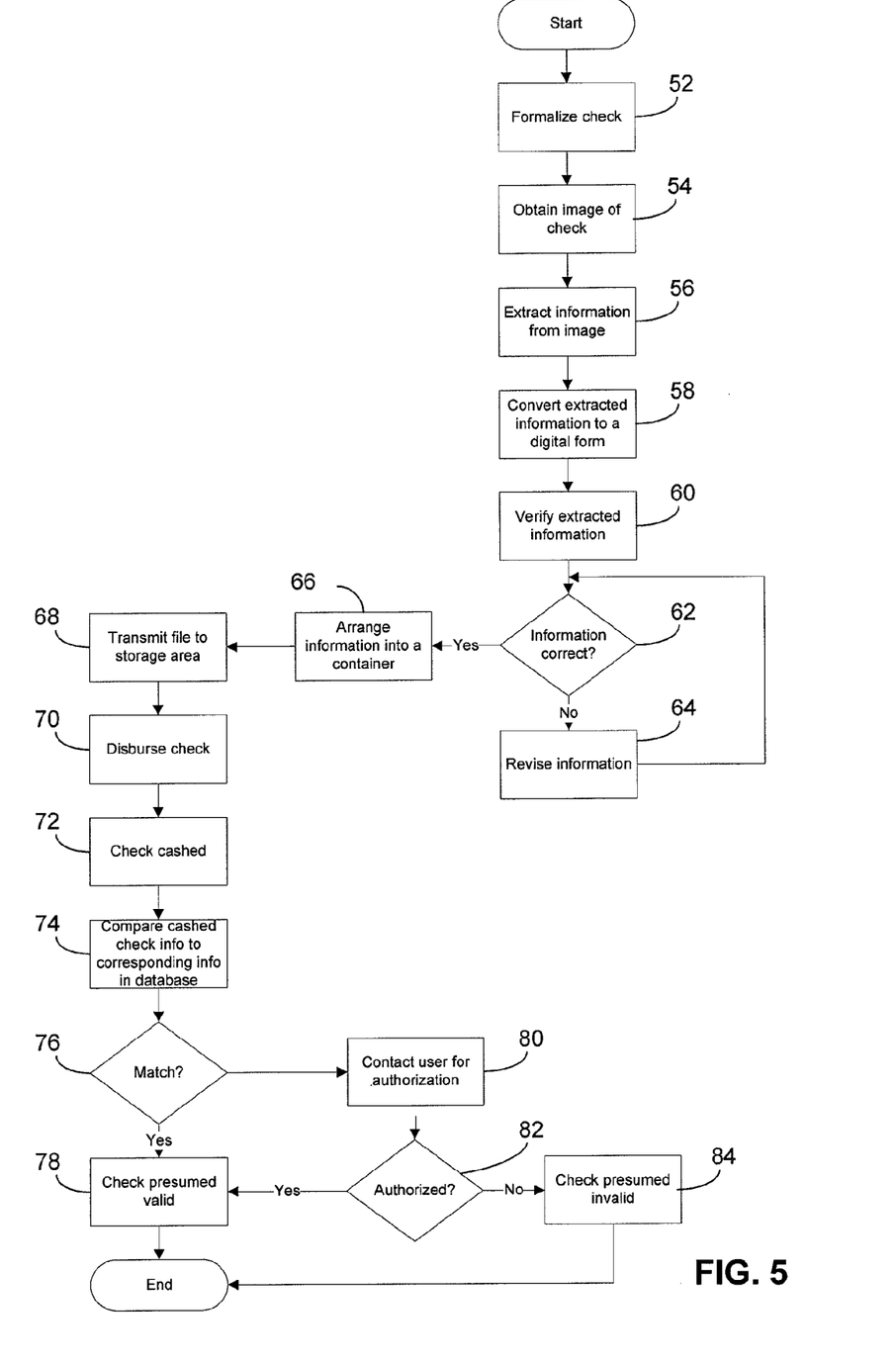
FIG. 5 is a flow chat illustrating an exemplary method in accordance with the invention.

With additional reference to FIG. 5, illustrated are logical operations to implement an exemplary method for assembling information contained within a financial instrument for subsequent verification of the financial instrument. The exemplary method may be carried out by executing an embodiment of one or more of the data extraction circuit 52, data assembly circuit 54, authentication circuit 32 and/or storage and retrieval circuit 34, for example. Thus, the flow chart of FIG. 5 may be thought of as depicting steps of a method carried out by the system in accordance with the invention.

Although FIG. 5 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning with block 52, a payer formalizes a check. In this regard, the payer specifies the name of the payee and the amount to be paid to the payee. Such formalization may be executed via a manual process, where the payer manually enters the information onto the check (e.g., the information is hand-written on the check). Alternatively, the formalization process may be accomplished at least in part with the assistance of a computer or the like. Regardless of how the check is formalized, once complete then at block 54 an image of the check is obtained prior to the check being transferred to the payee. The image may be obtained, for example, using a camera function of the image generating device, e.g., a camera function of a hand-held device, such as a smart phone, PDA, or the like. Preferably, the image is a photographic-quality image.

Upon obtaining the image, at block 56 the image is analyzed and information is extracted therefrom. For example, an OCR function or the like can be applied to the obtained image to identify and extract textual information therefrom. The information extracted from the check can include one or more of the payee name 10a, date 10b, amount 10c, routing number 10e, account number 10f, check number 10g and payer name 10h. The OCR function or other extraction function can be executed by the information generation device 14.

At block 58, the extracted information is converted into digital form and then verified to ensure that it accurately reflects the information on the check as indicated at block 60. Data verification may be performed, for example, by visually comparing the information on the actual check to information extracted from the image and displayed on a display device of the information generation device 14. At block 62 it is determined if the extracted information matches the corresponding information on the check 10, and if not then at block 64 the information may be revised. For example, the incorrect information may be manually revised via the user input device 44. Alternatively, another image of the check may be obtained and the extraction process repeated.

If the extracted information is correct, then at block 66 the extracted information is placed in a container, such as a file or the like, to facilitate transfer of the information for storage in the database 36. The file may be a metafile, text file or other type of file that enables importation of the data contained therein to the database 36. The container then is transmitted to a storage area as indicated at block 68. In this regard, the information is stored in the database 36 so as to enable retrieval of the information at a later time. More specifically, the information may be stored based on one or more of the routing number, account number, check number and payer name.

At block 70, the check is transferred to the payee. For example, the check may be mailed to the payee using, for example, the US postal service. A period of time after the check has been transferred to the payee, it may be presented for payment as indicated at block 72. For example, the check may be presented to a financial institution, such as a bank or a check cashing service, as is conventional.

The information on the check 10 is extracted and compared with the previously obtained information, as indicated at block 74. For example, a scanning device or the like can obtain an image of the check 10 and extract the information therefrom (much like the function of the information generation device). Alternatively, the information may be manually read and entered into a verification system. Based on the information extracted from the check 10, a search is performed in the database 36 for information corresponding to the check. For example, the routing number 10e, account number 10f, check number 10g and/or payer name 10h can be used to search the database for information corresponding to the check 10 and obtained prior to transferring the check to the payee. When found, the information can be retrieved from the database 36 and compared to the information as obtained from the check at the time it is presented for payment. For example, the payment amount 10c at the time the check is presented for payment can be compared to the payment amount 10c prior to the check being transferred to the payee. At block 76, if the information matches then the check is presumed valid as indicated at block 78. However, if the information does not match, then at block 80 the payer may be contacted to provide authorization to process payment of the check. At block 82, if the payer provides authorization, then the method moves back to block 78 and the check is considered valid. However, if authorization is not provided, then the check is considered invalid as indicated at block 84.

Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A system for assembling information contained within a financial instrument for subsequent verification of the financial instrument, the financial instrument including an identifier corresponding to a payee of the financial instrument, the payee being different from a payer of the financial instrument, comprising:
    an information generation device, comprising
        an image capture device configured to capture an image of an object, and
        a first communication circuit configured to communicate the extracted information over a network; and
    a verification device remote from the information generation device, the verification device comprising
        a second communication circuit configured to communicate with the first communication circuit over a network, and
        a database for storing information corresponding to financial instruments, said information for use during a subsequent verification process, wherein the verification device is configured to at least one of
    i) receive from the information generation device information extracted from an image of the financial instrument and store the extracted information in the database, said image captured prior to transfer of the financial instrument to the payee, or
    ii) receive an image of the financial instrument captured from the information generation device, extract information from the image, and store the extracted information in the database, said image captured prior to transfer of the financial instrument to the payee, and
    the verification device further configured to perform a verification process upon the financial instrument being presented for payment, said verification process comprising comparing information on the financial instrument as presented for payment with corresponding information stored in the database and obtained prior to transfer of the financial instrument to the payee.

2. The system according to claim 1, wherein the verification device comprises a verification device of a financial institution.

3. The system according to claim 1, wherein the verification device comprises an intermediate storage area independent from a payer of the financial instrument and a financial institution in which the payer has an account.

4. The system according to claim 1, wherein the information capture device comprises a mobile phone.

5. The system according to claim 1, wherein the information generation device or the verification device comprises a data extraction circuit configured to extract information from an image of a financial instrument captured.

6. The system according to claim 5, wherein the data extraction circuit is configured to extract at least one of a payment amount, a payment date, a payee name, an account number, a routing number or a check number.

7. The system according to claim 1, wherein the information generation device is configured to assemble extracted information into a container.

8. The system according to claim 7, wherein the information generation device is configured to assemble the extracted information into a container having the form of a file.

9. A method for assembling information contained within a financial instrument for subsequent verification of the financial instrument, the financial instrument including an identifier corresponding to a payee of the financial instrument, the method comprising:
    using an imaging device to obtain an image of the financial instrument, said image obtained prior to transferring the financial instrument to the payee, the payee being different from a payer of the financial instrument;
    extracting information from the image of the financial instrument; and
    transferring the extracted information to a storage area, wherein the storage area is separate and remote from the imaging device;
    storing the extracted financial information in a database;

upon the financial instrument being presented for payment, retrieving from the database the extracted information corresponding to the financial instrument presented for payment;

comparing the retrieved information to information on the financial instrument presented for payment; and making payment or denying payment based on the comparison.

10. A verification device for verifying a financial instrument, the financial instrument including an identifier corresponding to a payee of the financial instrument, the payee being different from a payer of the financial instrument, comprising:

a communication circuit configured to communicate over a network, and a database for storing information corresponding to financial instruments, said information for use during a subsequent verification process, wherein the verification device is configured to at least one of i) receive via the communication circuit information extracted from an image of the financial instrument and store the extracted information in the database, said image captured prior to transfer of the financial instrument to the payee, or ii) receive via the communication circuit an image of the financial instrument, extract information from the image, and store the extracted information in the database, said image captured prior to transfer of the financial instrument to the payee, and the verification device further configured to perform a verification process upon the financial instrument being presented for payment, said verification process comprising comparing information on the financial instrument as presented for payment with corresponding information stored in the database and obtained prior to transfer of the financial instrument to the payee.

* * * * *